US008836718B2

(12) United States Patent
Choi et al.

(10) Patent No.: US 8,836,718 B2
(45) Date of Patent: Sep. 16, 2014

(54) METHOD FOR PROVIDING USER INTERFACE IN PORTABLE TERMINAL

(75) Inventors: Hyong Uk Choi, Seoul (KR); Sung Wook Kang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 381 days.

(21) Appl. No.: 12/858,537

(22) Filed: Aug. 18, 2010

(65) Prior Publication Data

US 2011/0059775 A1 Mar. 10, 2011

(30) Foreign Application Priority Data

Sep. 7, 2009 (KR) .......................... 10-2009-0084165

(51) Int. Cl.

| | |
|---|---|
| *G06T 11/60* | (2006.01) |
| *G06F 3/0481* | (2013.01) |
| *G06F 3/0488* | (2013.01) |
| *H04M 1/725* | (2006.01) |
| *G06F 1/16* | (2006.01) |
| *H04W 64/00* | (2009.01) |
| *H04W 24/00* | (2009.01) |
| *H04W 88/02* | (2009.01) |

(52) U.S. Cl.
CPC ........ *H04M 1/72544* (2013.01); *H04W 64/006* (2013.01); *G06F 2200/1637* (2013.01); *G06F 3/0481* (2013.01); *G06F 3/0488* (2013.01); *H04W 24/00* (2013.01); *H04M 2250/12* (2013.01); *G06F 1/1694* (2013.01); *H04M 2250/22* (2013.01); *H04W 88/02* (2013.01)
USPC ............................ 345/619; 345/173; 455/566

(58) Field of Classification Search
CPC ......... G06T 11/60; G06T 19/00; G06T 11/00; G03F 7/70891; G06F 2200/1637; G06F 3/0488
USPC .................................. 345/619, 173; 455/566
See application file for complete search history.

(56) References Cited

U.S. PATENT DOCUMENTS

| | | | | |
|---|---|---|---|---|
| 7,068,294 | B2 * | 6/2006 | Kidney et al. ................. | 715/700 |
| 7,194,816 | B2 * | 3/2007 | Tamura ....................... | 33/355 R |
| 2003/0085870 | A1 * | 5/2003 | Hinckley ...................... | 345/156 |
| 2005/0219223 | A1 * | 10/2005 | Kotzin et al. ................. | 345/173 |
| 2006/0154711 | A1 * | 7/2006 | Ellis et al. ........................ | 463/1 |

(Continued)

FOREIGN PATENT DOCUMENTS

| | | | | |
|---|---|---|---|---|
| KR | 1999-34182 | 5/1999 | ............... | H04N 9/64 |
| KR | 10-667848 | 1/2007 | ............... | H04B 1/40 |

OTHER PUBLICATIONS

Horry, Youichi, et al. "A passive-style buttonless mobile terminal." Consumer Electronics, IEEE Transactions on 49.3 (2003): 530-535.*

*Primary Examiner* — James A Thompson
*Assistant Examiner* — Sarah Le
(74) *Attorney, Agent, or Firm* — Cha & Reiter, LLC

(57) ABSTRACT

A method for providing a UI in a portable terminal shows background images corresponding to physical states, such as the temperature, or of a physical layout of buildings, roads, etc. The method for providing a UI in a portable terminal, includes: collecting environmental information around the portable terminal; extracting an image set corresponding to the collected environmental information, and image change information; sensing a tilted state of the portable terminal; and changing and displaying the extracted image according to the sensed tilted state of the portable and the extracted image change information.

32 Claims, 14 Drawing Sheets

(56) References Cited

U.S. PATENT DOCUMENTS

| | | | |
|---|---|---|---|
| 2006/0291535 A1* | 12/2006 | Craig et al. | 374/208 |
| 2008/0039212 A1* | 2/2008 | Ahlgren et al. | 463/46 |
| 2008/0246778 A1* | 10/2008 | Ham et al. | 345/646 |
| 2008/0307361 A1* | 12/2008 | Louch et al. | 715/835 |
| 2009/0070695 A1* | 3/2009 | Oh et al. | 715/769 |
| 2009/0091542 A1* | 4/2009 | Inaba et al. | 345/173 |
| 2009/0227296 A1* | 9/2009 | Kim | 455/566 |
| 2009/0309711 A1* | 12/2009 | Adappa et al. | 340/501 |

\* cited by examiner

| TEMPERATURE | MATERIAL STATE |
|---|---|
| 0°C | Ice |
| 0°C~10°C | melting |
| 10°C~15°C | cool water |
| 15°C~25°C | water |
| 25°C~30°C | warm water |
| 30°C~ | steam |

<a>

<b>

METHOD FOR PROVIDING USER INTERFACE IN PORTABLE TERMINAL

CLAIM OF PRIORITY

This application claims the benefit of priority under 35 U.S.C. §119 from Korean Patent Application No. 10-2009-0084165 filed Sep. 9, 2009, the contents of which are hereby incorporated by reference in its entirety.

BACKGROUND OF THE INVENTION

1. Field of the Invention

The present invention relates to a method for providing a user interface (UI) in a portable terminal. More particularly, the present invention relates to a method for providing a UI through by providing a sensor in a portable terminal for sensing.

2. Description of the Related Art

In recent years, with the spread of portable terminals rapidly increasing, such portable terminals have become one of a modern person's necessities. Portable terminals may provide all kinds of data transmission services and various additional services as well as unique voice call service and change to a functional multimedia communication device as desired.

In recent years, a portable terminal technology has developed to consider a user's emotional side as well as a functional side. For example, a given sensor is mounted on the portable terminal. A user receives a UI as a sensing result of the sensor. Now, a UI providing technology using the sensing of a single sensor has been variously developed in a portable terminal. However, the development in a UI providing technology using cooperative sensing a plurality of sensors is insufficient.

However, if a user receives a UI based on a UI providing technology using cooperative sensing from a plurality of sensors, whereby the user can feel improved emotional pleasure upon using the portable terminal.

SUMMARY OF THE INVENTION

The present invention has been made in view of the above problems, and provides a method for providing a UI in a portable terminal that may improve user' emotional pleasure.

In accordance with an exemplary aspect of the present invention, a method for providing a user interface (UI) in a portable terminal, preferably includes: collecting environmental information around the portable terminal; extracting an image set corresponding to the collected environmental information, and image change information; sensing a tilted state of the portable terminal; and changing and displaying the extracted image according to the sensed tilted state of the portable and the extracted image change information.

In accordance with another exemplary aspect of the present invention, a method for providing a user interface (UI) in a portable terminal, preferably includes: collecting environmental information around the portable terminal; extracting an image set corresponding to the collected environmental information, and image change information; displaying the extracted image; sensing a user input to the portable terminal; and changing and displaying the displayed image according to the sensed user input and the extracted image change information.

In accordance with another exemplary aspect of the present invention, a portable terminal for providing a user interface (UI), preferably includes: a first sensor unit for collecting environmental information around the portable terminal; a second sensor unit for sensing a tilted state of the portable terminal or a user input to the portable terminal; a storage unit for storing an image corresponding to the environmental information, and image change information; a display unit for displaying the image; and a control unit for receiving the collected environmental information from the first sensor unit, extracting the image corresponding to the received environmental information and the image change information from the storage unit, receiving the tilted state of the portable terminal or the user input information from the portable terminal, and controlling the display unit to change and display the extracted image based on the extracted image change information and the received tilted state information or the user input information.

A user can feel improved emotional pleasure (e.g. satisfaction of owning such a device) upon using a portable terminal according to the present invention.

BRIEF DESCRIPTION OF THE DRAWINGS

The exemplary objects, properties and advantages of the present invention will become more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

Figure 1:
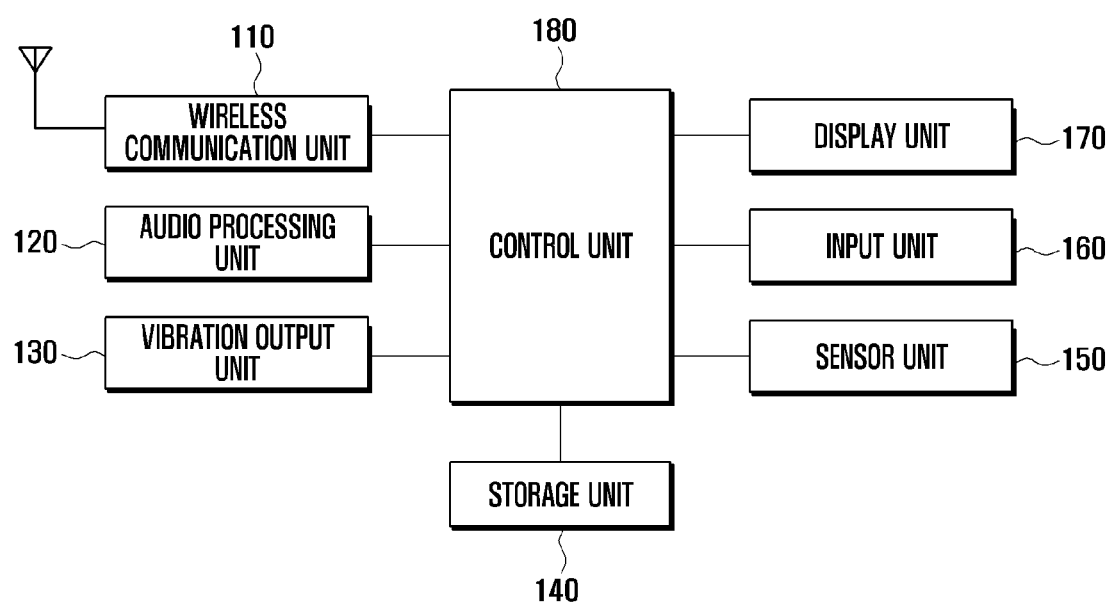
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

A wireless communication unit 110 performs transmitting and receiving functions of corresponding data for wireless communication of the portable terminal. The wireless communication unit 110 may include an RF transmitter for up-converting a frequency of a transmitted signal and amplifying the signal, and an RF receiver low-noise-amplifying a received signal and down-converting the signal. Further, the wireless communication unit 110 may receive and output data through a wireless channel to a control unit 180, and transmit data output from the control unit 180 through the wireless channel. The wireless communication unit 110 may receive weather information at a current time from a server providing weather information through a wireless communication network, and transmit it to the control unit 180. The weather information may include, for example, temperature information, humidity information, and atmospheric condition information.

The audio processing unit 120 may be configured by a CODEC. The CODEC preferably includes a data CODEC processing packet data and an audio CODEC processing an audio signal such as voices. The audio processing unit 120 converts a digital audio signal into an analog audio signal using an audio CODEC, and plays the analog audio signal using a speaker (SPK) (not shown). Further, the audio processing unit 120 converts an analog audio signal input from a microphone (MIC) into a digital audio signal using the audio CODEC.

A vibration output unit 130 comprises a structural element performing a function generating and outputting vibration, and is configured by a vibration motor. The vibration output unit 130 generates and outputs vibration under the control of the control unit 180.

A storage unit 140 serves to store programs and data necessary for an operation of the portable terminal. The storage unit 140 may be, for example, divided into a program area and a data area. The storage unit 130 may be configured by a volatile storage medium, a nonvolatile storage medium, or a combination thereof. The volatile storage medium preferably includes semiconductor memories such as RAM, DRAM, or SRAM. The nonvolatile storage medium preferably includes hard disks. The storage unit 140 stores environmental information around the portable terminal corresponding to an image and image change information. In an exemplary embodiment of the present invention, the storage unit 140 may store environmental information around the portable terminal corresponding to a sound and vibration pattern.

A sensor unit 150 collects environmental information around the portable terminal or senses a user input to the portable terminal and a tilted state of the portable terminal. The sensor unit 150 can be composed of a first sensor unit for collecting environmental information around the portable terminal, and a second sensor unit for sensing a user input to the portable terminal or a tilted state of the portable terminal. The first sensor unit can be configured, for example, by a temperature sensor and a humidity sensor. The first sensor unit collects and transfers temperature information and humidity information to a control unit 180. The sensor unit can be configured by an acceleration sensor, a terrestrial magnetic field sensor, a gyro sensor, a touch sensor, and a proximity sensor. The second sensor unit senses a user input to the portable terminal or a tilted state of the portable terminal, and transfers a sensed result to the control unit 180. The sensor unit 150 according to an exemplary embodiment of the present invention is not limited to the foregoing sensors. An illumination sensor, an infrared sensor, a speech recognition sensor, and an image sensor (camera module) are some non-limiting examples of sensors that can be used as the sensor unit 150.

With continued reference to FIG. 1, an input unit 160 receives a user's key operation signal for controlling the portable terminal and transfers of the key operation signal to the control unit 180. The control unit is typically a microprocessor. The input unit 150 can be configured by a keypad with numeric keys, character keys, and arrow keys such as a 3*4 keyboard, a Qwerty keyboard. The input unit 150 may be configured by a touch pad. The input unit 160 generates input signals executing functions of a portable terminal according to a user's input, and transfers the input signals to the control unit 180. Among sensors constituting the sensor unit 150, a sensor such as an acceleration sensor, a touch sensor, a gyro sensor, a terrestrial magnetic field sensor for sensing the user input can all provide a function as the input unit 160.

A display unit 170 may be a Liquid Crystal Display (LCD), which visibly provides menus of the portable terminal, input data, function set information and various other information to a user. However, an OLED, or other types of thin film screen technology may also be used.

A control unit 180 controls overall operations of the portable terminal and signal flow between internal blocks therein. The control unit 180 controls the first sensor unit of the sensor unit 150 to collect environmental information around an exterior of the portable terminal. The control unit 180 extracts from the storage unit 140 an image corresponding to the collected environmental information and the image change information. The control unit 180 controls the second sensor unit of the sensor unit 150 to sense a user input to the portable terminal or a tilted state of the portable terminal. The control unit 180 controls the display of display unit 170 to change and display the extracted image according to the extracted image change information and the sensed user input to the portable terminal or the sensed tilted state of the portable terminal. In an exemplary embodiment of the present invention, the control unit 180 may extract from the storage unit 140 sound or vibration pattern information corresponding to the collected environmental information. After the control unit 180 controls the second sensor unit of the sensor unit 150 to sense a user input to the portable terminal or a tilted state of the portable terminal, the control unit may control an audio processing unit 120 or a vibration output unit 130 to output sound or vibration according to the extracted sound or vibration pattern information, and the sensed user input to the portable terminal or the sensed tilted state of the portable terminal.

A portable terminal according to an exemplary embodiment of the present invention may include, for example, a near distance wireless communication unit (not shown) except for the foregoing structural elements. The near distance wireless communication unit is a device to enable data communication between portable terminals in a given radius. The near distance wireless communication unit can be configured by a Bluetooth communication module, an Infrared communication module, a Zigbee communication module, a Wifi communication module, a Near Field Communication (NFC) module, a Radio Frequency Identification (RFID) module, etc., just to name some non-limiting examples.

Figures 2, 3:
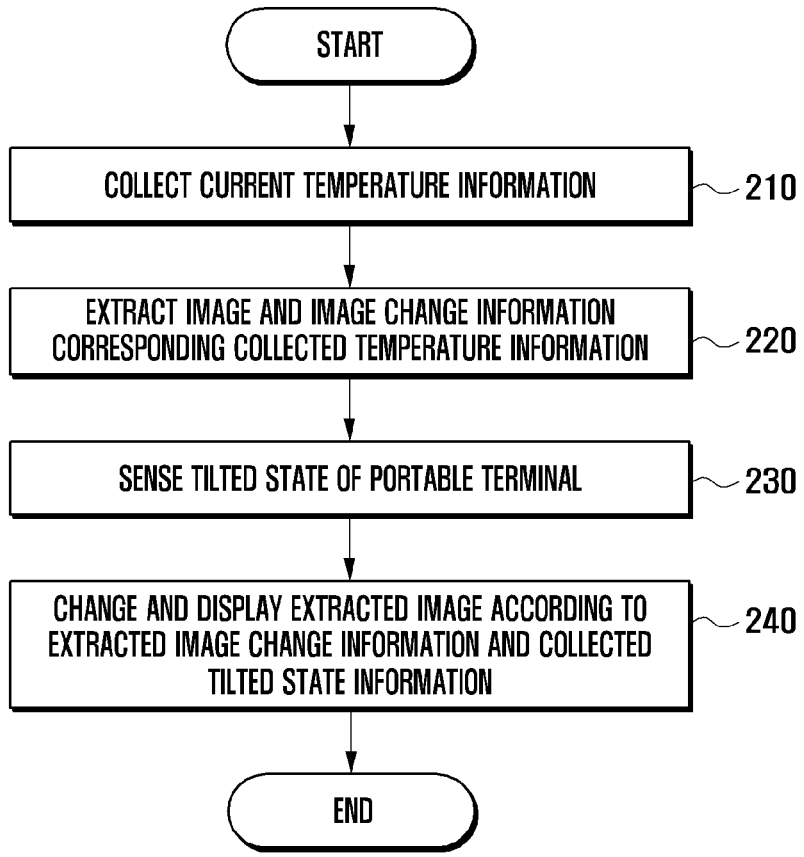
FIG. 2 is a flow chart illustrating a method for providing a User Interface (UI) by a portable terminal according to a first exemplary embodiment of the present invention.
FIG. 3 is a view illustrating material state information classified by temperatures according to a first exemplary embodiment of the present invention.

FIG. 2 is a flow chart illustrating a method for providing UI by a portable terminal according to a first exemplary embodiment of the present invention. A sensor unit 150 (shown in FIG. 1) according to a first exemplary embodiment of the present invention preferably includes a first sensor unit and a second sensor unit. The first sensor unit is configured by a sensor collecting temperature information, and the second sensor unit is configured by a sensor sensing a tilted state of orientation of the portable terminal.

At step (210), a control unit 180 controls the first sensor unit to collect current temperature information around a portable terminal. In an exemplary embodiment of the present invention, the control unit 180 may control a wireless communication unit 110 to collect temperature information from a server providing weather information through a wireless communication network.

At step (220), the control unit 180 extracts an image corresponding to the collected temperature information and image change information from a storage unit 140. In the first exemplary embodiment, the image is an image of a material whose state can be changed according to a temperature. The material image is formed of a background image. For example, since a state of 'water' can be changed to 'ice', 'water', or 'steam', a 'water' image may correspond to an image of the first exemplary embodiment. To extract the image corresponding to the temperature information and the image change information, the control unit 180 first checks material state (status) information corresponding to the collected temperature information. Material state information is stored in the storage unit 140 by temperatures. The control unit 180 can check the material state information corresponding to the collected temperature information from the storage unit 140.

FIG. 3 is a view illustrating material state information classified by temperatures according to a first exemplary embodiment of the present invention. The material state information is stored that information to 0° C. is as 'ice', information of 0~10° C. is as 'melting', information of 10~15° C. is as 'cool water', information of 15~25° C. is as 'water', information of 25~30° C. is as 'warm water', and information greater than 30° C. is as 'steam'. The temperature can be set to reflect or regardless of real properties of a material. For example, when the material is 'water', if real properties of the material are reflected, material state information of an 'ice' should be set to a temperature less than 0 °C., and material state information of a 'steam' be set to a temperature greater than 100° C. However, because the portable terminal really exists in a room temperature, material state information can be optionally set based on a room temperature. FIG. 3 illustrates material state information according to temperature information optionally set based on the room temperature.

The storage unit 140 according to an exemplary embodiment of the present invention stores an image corresponding to respective material state information, and image change information. The image corresponds to a material image capable of perceiving a material state intuitively (freezing water image in a case of 'ice', flowing water image in a case of 'water', steam image in a case of 'steam'). The image change information may correspond to information regarding an image change amount or a changed speed according to a change in a tilted state of the portable terminal. The control unit 180 checks material state information and then extracts an image corresponding to the checked material state information and image change information. For example, when current temperature information is 17° C., the control unit 180 checks that material state information is 'water' from the storage unit 140 and then extracts an image (flowing water image) corresponding thereto and image change information (image change amount or changed speed according to a change in a tilted state) from the storage unit 140.

At step (230), the control unit 180 controls the second sensor unit to sense a tilted state of the portable terminal. The tilted state of the portable terminal is associated with a positioned pattern of the portable terminal. The portable terminal may lie, stand on a desk, or slants in up, down, left and right directions at given angle. The control unit 180 controls the second sensor unit configured by acceleration sensor or terrestrial magnetic field sensor to sense a tilted direction and angle of the portable terminal.

Figure 4A:
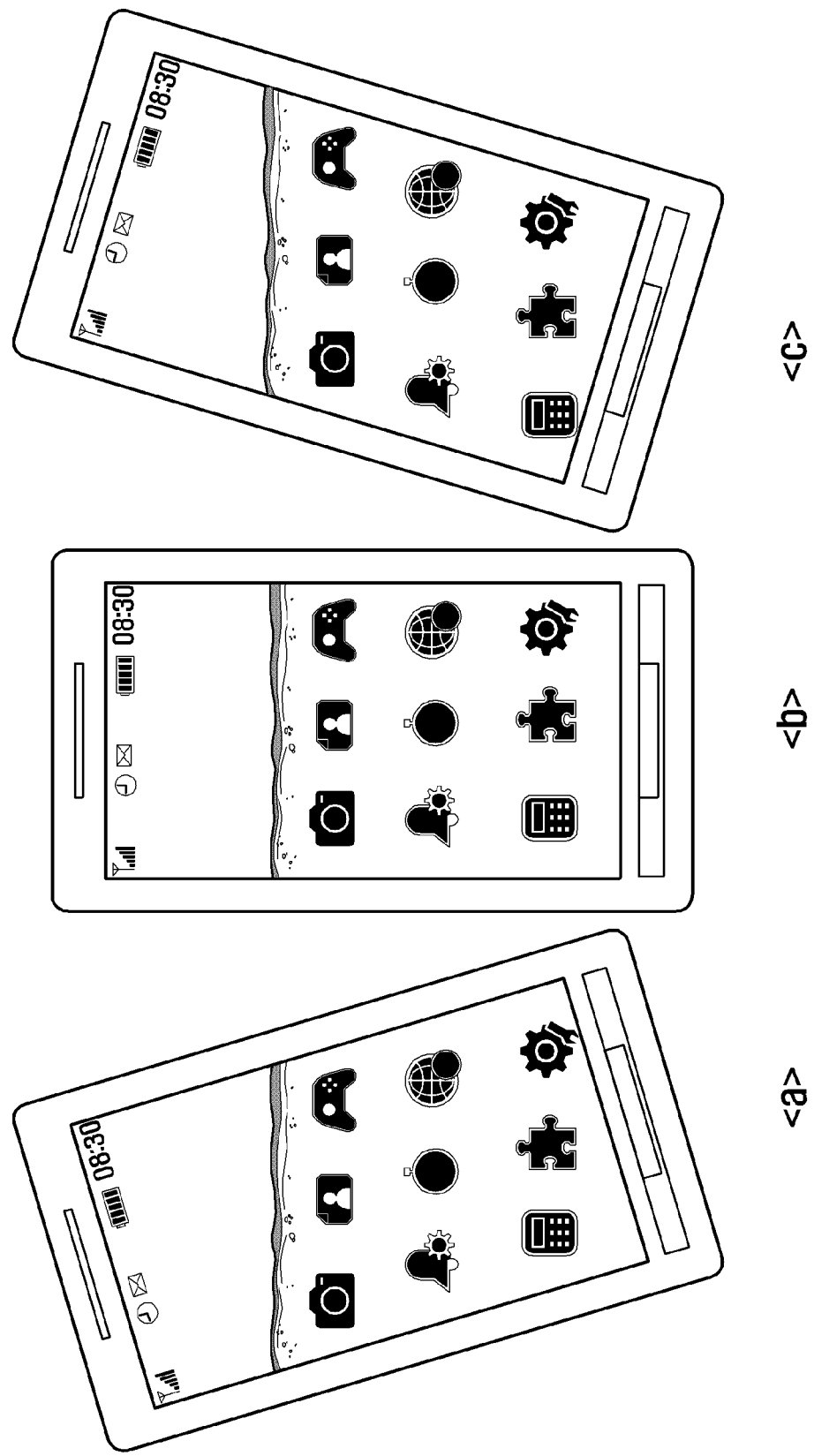
FIGS. 4A to 4C are views illustrating display screens displayed by providing a UI according to a first exemplary embodiment of the present invention, respectively.
Figure 4B:
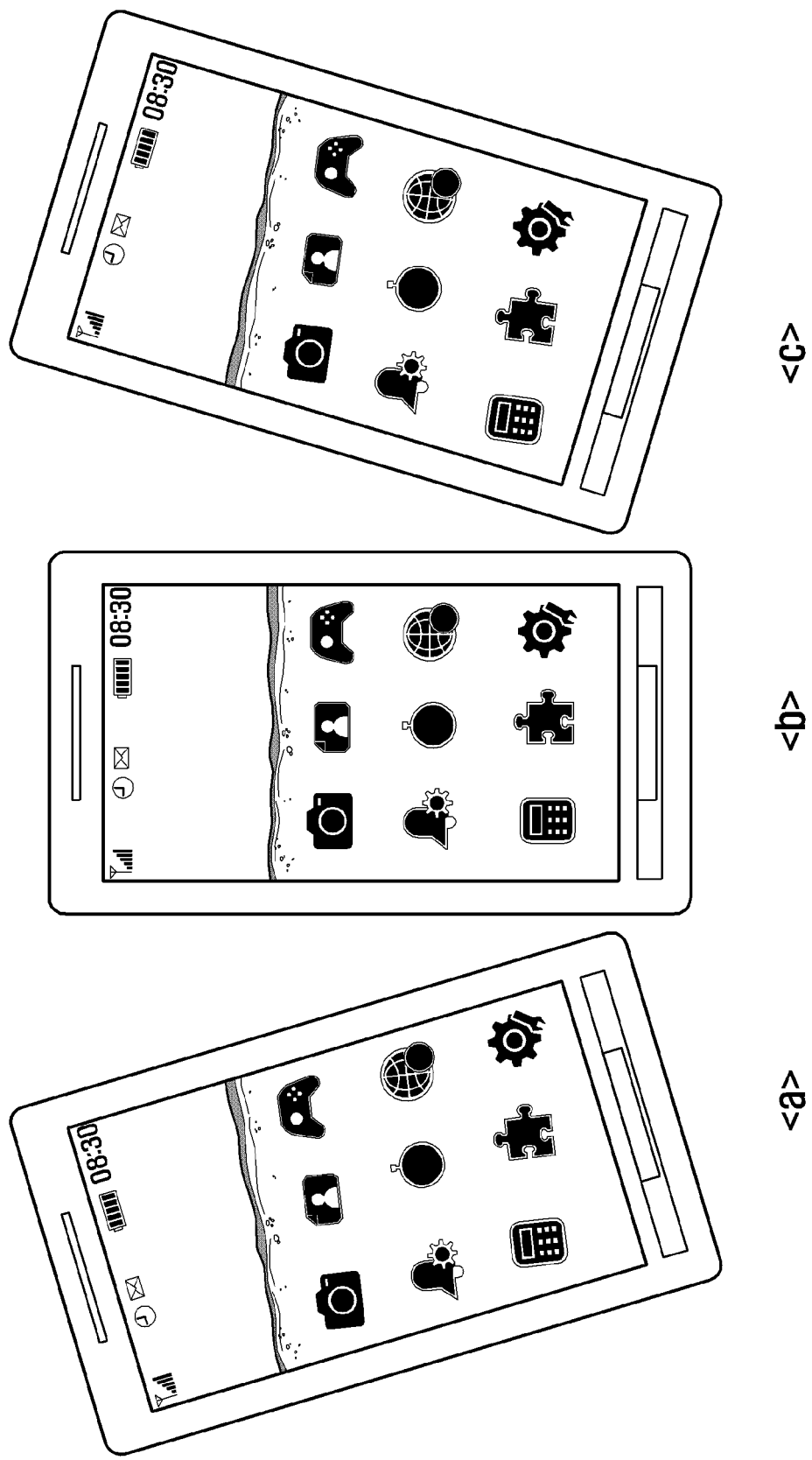
Figure 4C:
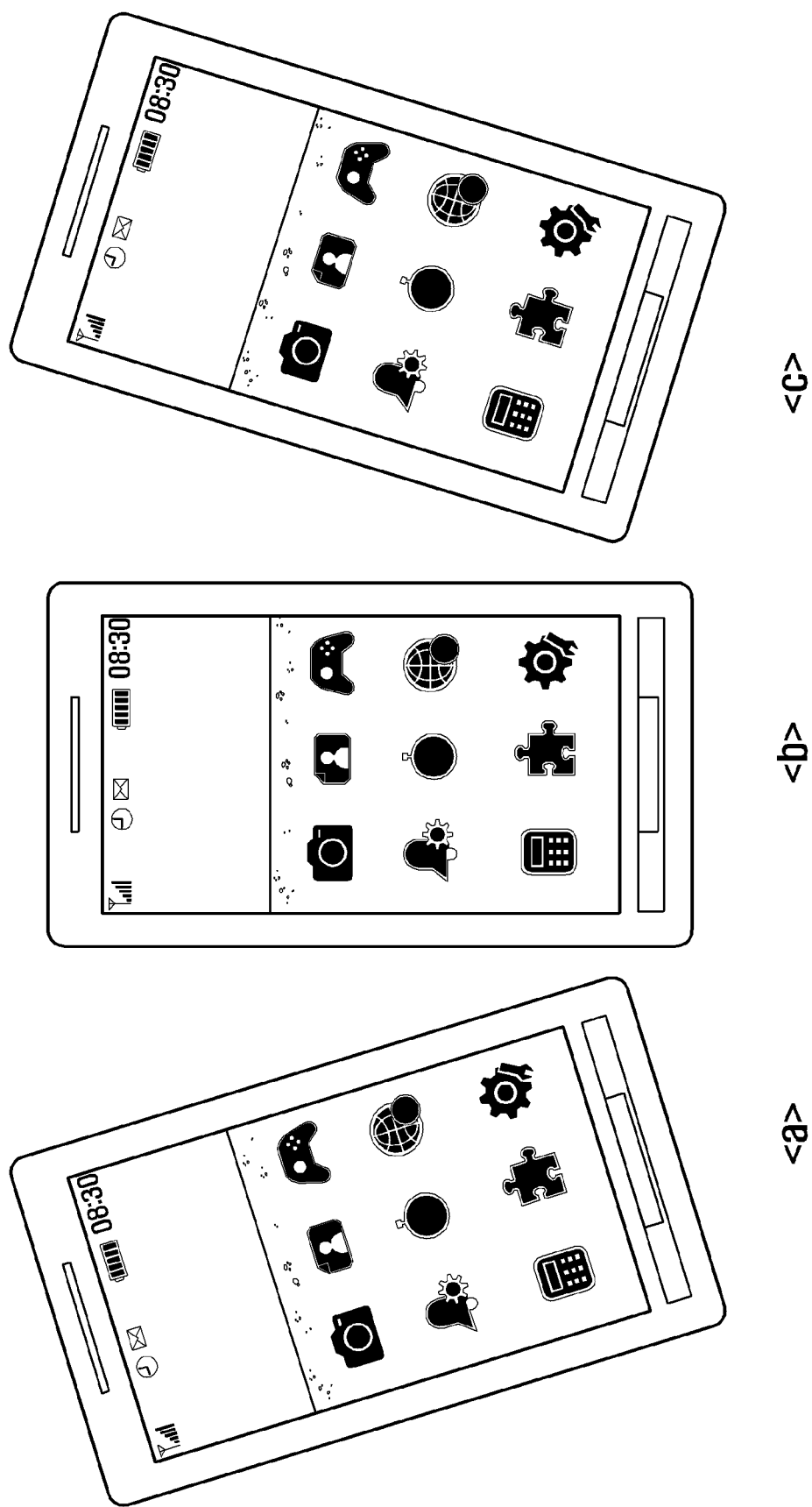

At step (240), the control unit 180 controls the display unit 170 to change and display the extracted image according to the extracted image change information and the collected tilted state information of the portable terminal. For example, the control unit 180 may control the display unit 170 to adjust and display a tilt of a background image (extracted image). In an exemplary embodiment of the present invention, the control unit 180 may control the display unit 170 to display at least one icon on the background image together therewith. Upon displaying the at least one icon, the control unit 180 controls the display unit 170 to change and display a tilt or a position of the icon according to the image change information and tilted state information of the portable terminal. FIGS. 4A to 4C are views illustrating display screens displayed by providing a UI according to a first exemplary embodiment of the present invention, respectively. Referring to the material states of FIG. 3, a background image shown in FIG. 4A is a material image of a 'water' state. A background image shown in FIG. 4B is a material image of a 'melting' state which shows a slight tilt angle difference than FIG. 4A. A background image shown in FIG. 4C is a material image of an 'ice' state. Icons are illustrated in FIGS. 4A to 4C together with the background images, respectively. A portable terminal stands in a [b] of FIG. 4A. The portable terminal slants in a left direction at a given angle in an [a] of FIG. 4A. The portable terminal slants in a right direction at a given angle in a [c] of FIG. 4a.

The control unit 180 displays a background image and an icon according to image change information (image change amount information according to a change in a tilted state) and a tilted state of a portable terminal sensed by the second sensor unit. The [b] of FIG. 4A shows a background image of a pattern that a portable terminal is put in water and a plurality of icons on the background image. The [a] and [c] of FIG. 4B change and display a pattern of a background image (tilt of water surface) and a tilt or position of an icon according to a tilted angle of the portable terminal.

FIG. 4B shows a pattern of a background image and a tilt of an icon differently from those of FIG. 4A in the same tilted state. In real properties of a material, melting water has liquidity and moving speed lower than those of completely melted water. Such real properties of a material are reflected such that an image change amount (image change information) according to a tilt corresponding to a 'melting' state is set a value less than that of a 'water' state. Accordingly, the control unit 180 controls the second sensor unit to differently display an image according to the extracted image change information although the sensed tilted state of the portable has the same value. Upon comparing [a] and [c] of FIG. 4B with [a] and [c] of FIG. 4A, the portable terminal is displayed to slant at the same angle but a pattern of a background image (tilt of a water surface) and a tilt of an icon are differently displayed. This different display is the reason why image change information corresponding to a 'melting' state and image change information corresponding to a 'water' state are set to different values, respectively.

A background image configured by a material image of an 'ice' state and a plurality of icons are illustrated in FIG. 4C. In this case, the background image and a plurality of icons are displayed to be fixed regardless of a tilted state of the portable terminal. Because an ice is in a solid state, a water surface is not changed according to a tilt. When a given solid material is also included in the ice, a solid material is fixed to an ice not to be moved. Such real properties of a material are reflected such that the portable terminal does not change and display a background image and an icon according to a tilted state in an 'ice' state. The [a] and [c] of FIG. 4C indicate a pattern of the portable terminal of the [b] of FIG. 4C slanting in left and right directions, respectively. In the [a] and [c] of FIG. 4C, the background image and the icons are displayed not to be changed. Upon comparing FIGS. 4A to 4C with each other, when the portable terminal also slants in the same direction and angle, the reason for displaying different images is that image change information corresponding to a 'water' state, image change information corresponding to a 'melting', and image change information corresponding to an 'ice' are differently set. A user can estimate what is a current temperature based on tilts of a background image and an icon.

In an exemplary embodiment of the present invention, after step 240, the control unit 180 controls a sensor unit 150 or an input unit 160 to sense whether a user touch is input in the portable terminal. When the touch input is sensed, the control unit 180 may control the display unit 170 to display an effect image on an area of the touch input. In an exemplary embodiment of the present invention, the control unit 180 may also extract an effect image corresponding to the background image corresponding to current temperature information upon extracting the background image at step 220. In this case, the storage unit 140 stores a background image and an effect image corresponding to material state information.

Figure 4D:
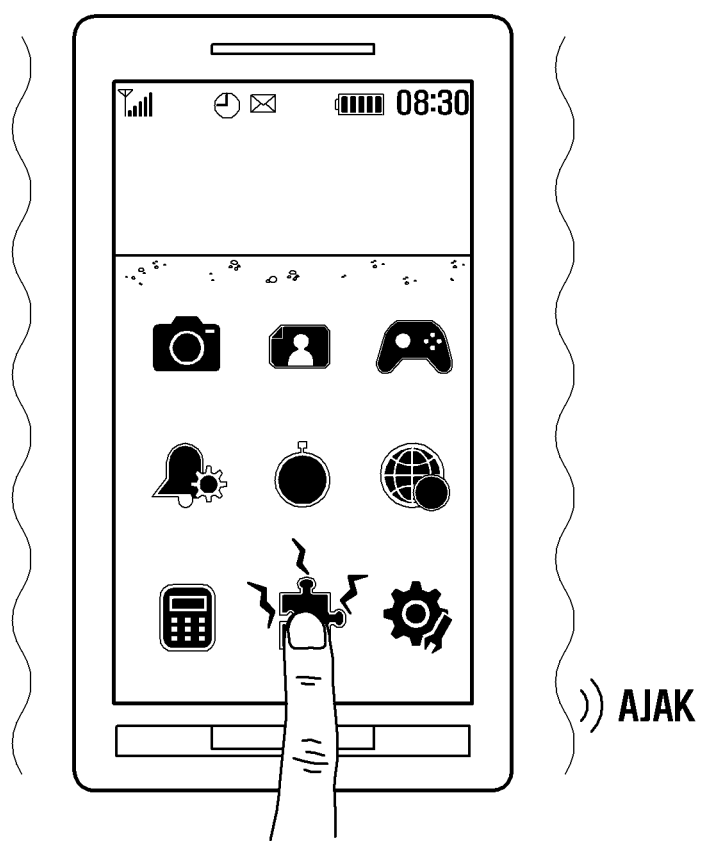

FIG. 4D indicates an effect image displayed when a user touches an icon. FIG. 4D displays an image of a broken ice around a touched icon when a user touches the icon in a state that a background image of an 'ice' state is displayed. The storage unit 140 stores an effect image corresponding to an 'ice' state. The control unit 180 extracts an effect image corresponding to collected current temperature information from the storage unit 140. The control unit 180 also controls a sensor unit 150 or an input unit 160. When a user's touch input is sensed, the control unit 180 controls the display unit 170 to display the extracted effect image on a region of the touch input. FIG. 4D shows an exemplary embodiment in which a user touches an icon. However, the present invention is not limited thereto. When areas other than the icon region are also touched, the control unit 180 may control the display unit 170 to display the extracted effect image on a region of the touch input.

In an exemplary embodiment of the present invention, the storage unit 140 may store sound or vibration pattern information corresponding to current temperature information. In this case, the control unit 180 also extracts sound or vibration pattern information upon extracting an image corresponding to current temperature information and image change information at step 220. After step 240, the control unit 180 controls the sensor unit 150 or the input unit 160. When a user's touch input is sensed, the control unit 180 controls an audio processing unit 220 or a vibration output unit 130 to output sound or vibration according to extracted sound or vibration pattern information. FIG. 4D shows a pattern of vibration generated and a pattern of a sound output when a user inputs a touch on the portable terminal. Because a background image shown in FIG. 4D is a background image of an 'ice' state, a broken sound ('ajak') of an ice may be output when a user inputs a touch. As shown in FIG. 4A, if a background image of a 'water' state is displayed, a falling sound of water drops may be output when a user inputs a touch of the screen. Due to different sound and vibration pattern information being stored according to temperature information, when a current temperature varies, a user may receive varied sound or vibration UI.

An exemplary embodiment of the present invention may include a step of setting a kind of a material displayed as an image before performing step 210. There are various materials whose state varies according to a temperature. Respective materials have different patterns (e.g., colors). Further, because state variation occurs in different temperatures (e.g., boiling point, freezing point) according to materials, states of the materials may be different in the same temperature condition. For example, wine, perfume, beer, juice, milk, and coffee are different in shape, and state variation occurs in different temperatures from each other. The listed materials can be selectively provided when a material displayed as an image is selected. The portable terminal may include a menu for selecting a kind of a material to be used as an image. When a user selects the menu, the portable terminal lists display selective materials. When a user selects one material, the portable terminal constructs a background image as an image associated with the selected material. The storage unit 140 stores material state information by materials according to temperatures. The control unit 180 may extract an image and image change information (or sound or vibration pattern information) using material state information according to a temperature range associated with a material selected by a user.

A first exemplary embodiment of the present invention provides a corresponding UI (output image, sound, vibration) to a user using a first sensor unit collecting temperature information and a second sensor unit collecting tilted state information of the portable terminal such that the user can feel improved emotional pleasure.

Figure 5:
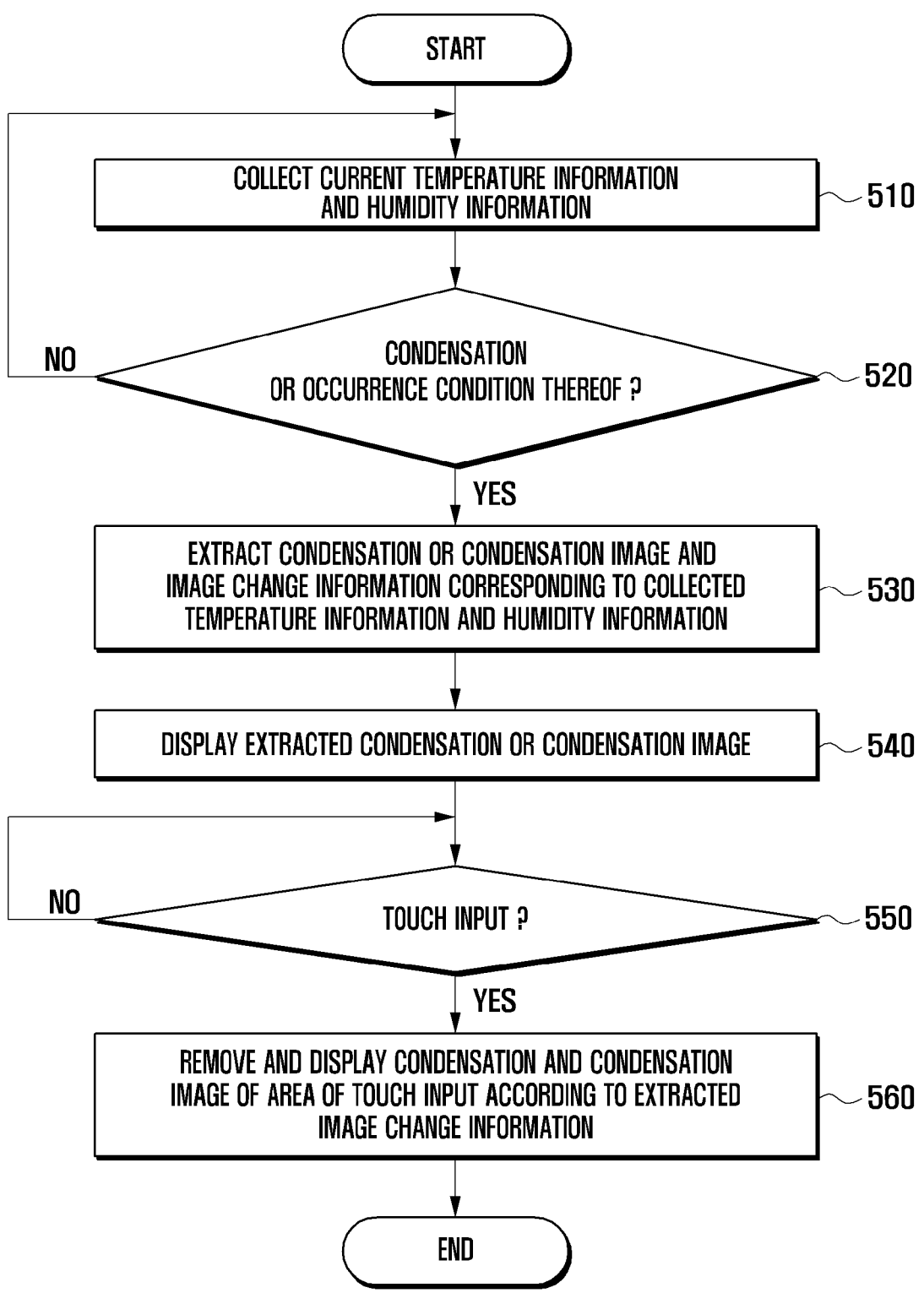
FIG. 5 is a flow chart illustrating a method for providing UI by a portable terminal according to a second exemplary embodiment of the present invention.

FIG. 5 is a flow chart illustrating a method for providing UI by a portable terminal according to a second exemplary embodiment of the present invention. In the second exemplary embodiment of the present invention, a sensor unit 150 includes a first sensor unit and a second sensor unit. The first sensor unit is composed of a sensor collecting temperature information and humidity information. The second sensor is composed of a sensor sensing a touch input to the potable terminal.

At step (510), the control unit 180 controls the first sensor unit to collect current temperature information and humidity information around a portable terminal. In an exemplary embodiment of the present invention, the control unit 180 may control the wireless communication unit 110 to collect temperature information and humidity information from a server providing weather information through a wireless communication network.

At step (520), the control unit 180 analyzes the collected temperature information and humidity information to check whether they correspond to an occurrence condition of condensation or frost formation. The storage unit 140 stores information regarding an occurrence condition of condensation or frost formation. The control unit 180 compares the collected temperature information and humidity information with the stored occurrence condition of condensation or frost formation. The occurrence condition of condensation or frost formation can be set to reflect an occurrence condition of real condensation or frost formation, or as given data.

At step (530), when the collected temperature information and humidity information correspond to the occurrence condition of condensation or frost formation, the control unit 180 extracts a condensation or frost formation image corresponding to the collected temperature information and humidity information and image change information from the storage unit 140. In the second exemplary embodiment of the present invention, the image change information may be input intensity information of a touch required to remove the condensation or condensation image.

At step (540), the control unit 180 controls the display unit 170 to display the extracted condensation or condensation image. In this case, the condensation or frost formation image can be displayed on a display screen as an image of humidity or frost form.

At step (550), the control unit 180 controls the second sensor unit to sense a touch input to the portable terminal. The second sensor unit in the second exemplary embodiment of the present invention is a touch sensor constituting a touch screen. Further, it is assumed that a user inputs a touch on an area on which a condensation or frost formation image is displayed. At step (560), when the touch input to the portable terminal is sensed, the control unit 180 controls a display unit 170 to remove and display the condensation and frost formation image of the area on which the touch is input according to the extracted image change information.

Figure 6:
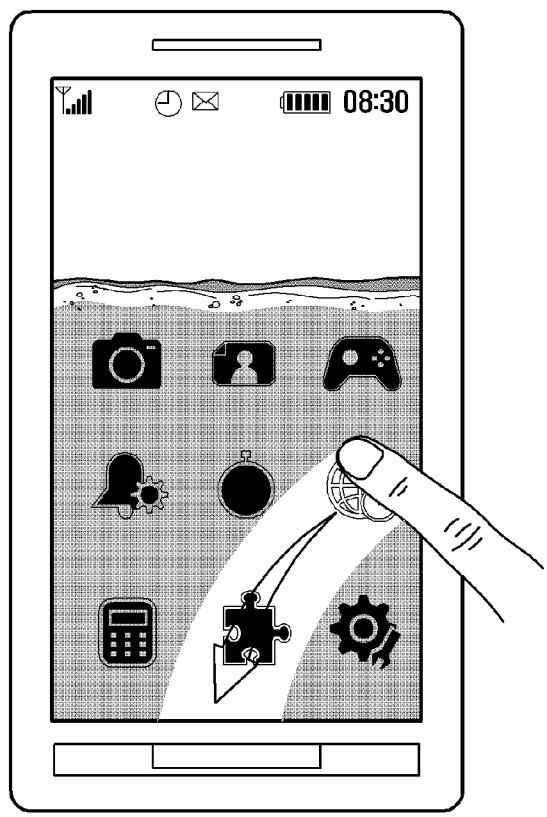
FIG. 6 is a view illustrating display screens displayed by providing a UI according to a second exemplary embodiment of the present invention.
Figure 6:
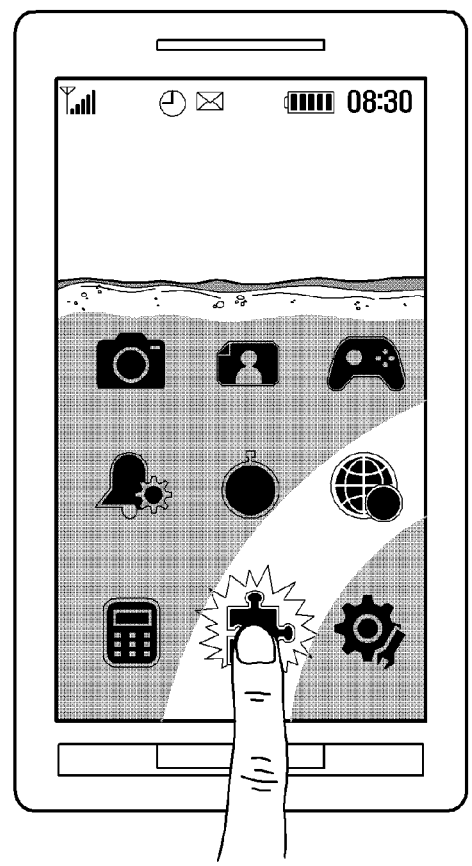

FIG. 6 is a view illustrating a display screen displayed by providing a UI according to a second exemplary embodiment of the present invention. Example [a] of FIG. 6 shows a pattern that a user inputs a drag on an area on which a condensation or frost formation image is displayed. The condensation or frost formation image is displayed to be removed in an input area of the drag. However, the condensation or frost formation image is continuously display in an area on which the drag is not input.

In an exemplary embodiment of the present invention, required touch input intensity can differently set to remove the condensation and frost formation images. In practice, removing frost formed on a window requires a force stronger than that in removing humidity formed on the window. Such properties of a material are reflected and an image change information is set. A touch input intensity required to remove the frost formation image is stored to be greater than that required to remove the frost formation image. A user should input a drag to increase an input intensity larger in a case of removing the frost formation image than that of removing the condensation image. In an exemplary embodiment of the present invention, image changing information can be set to correspond to the input number of touches instead of the touch input intensity. In this case, the input number of touches required to remove the frost formation image is stored to be greater than that required to remove the condensation image. For example, removing the condensation image may require one drag, but removing the frost formation image may require a plurality of drags.

In an exemplary embodiment of the present invention, after performing step 560, the control unit 180 controls the second sensor unit to sense whether a touch is input to a part from which the condensation or frost formation image is removed. When an icon is disposed on the part from which the condensation image or the frost formation image is removed, and is touched, the control unit 180 may execute a function corresponding to the touched icon. Example [b] of FIG. 6 illustrates a pattern that a user touches an icon located on the part from which the condensation image or the frost formation image is removed.

Namely, the control unit 180 controls the second sensor unit to sense a touch input. When a touched area corresponds to the condensation image or the frost formation image, the control unit 180 removes and display the condensation image or the frost formation image. When the touched area corresponds to an area from which the condensation image or the frost formation image is removed, the control unit 180 recognizes it as a general touch input. When a touch is input on the icon, the control unit 180 executes a corresponding function.

In the same manner as in the first embodiment, a storage unit 140 in a second exemplary embodiment of the present invention may store sound or vibration pattern information corresponding to temperature information and humidity information. In this case, with continued reference to FIG. 5, at step (530) the control unit 180 also extracts sound or vibration pattern information together with the image and image change information corresponding to current temperature information and humidity information. The extracted sound or vibration pattern information can be used to output sound or vibration according a user's touch input.

A second exemplary embodiment of the present invention provides a corresponding UI (image, sound, vibration output) to a user using a first sensor unit collecting temperature and humidity information and a second sensor unit sensing a touch input to the portable terminal such that the user can feel improved emotional pleasure in using the portable terminal.

Figure 7:
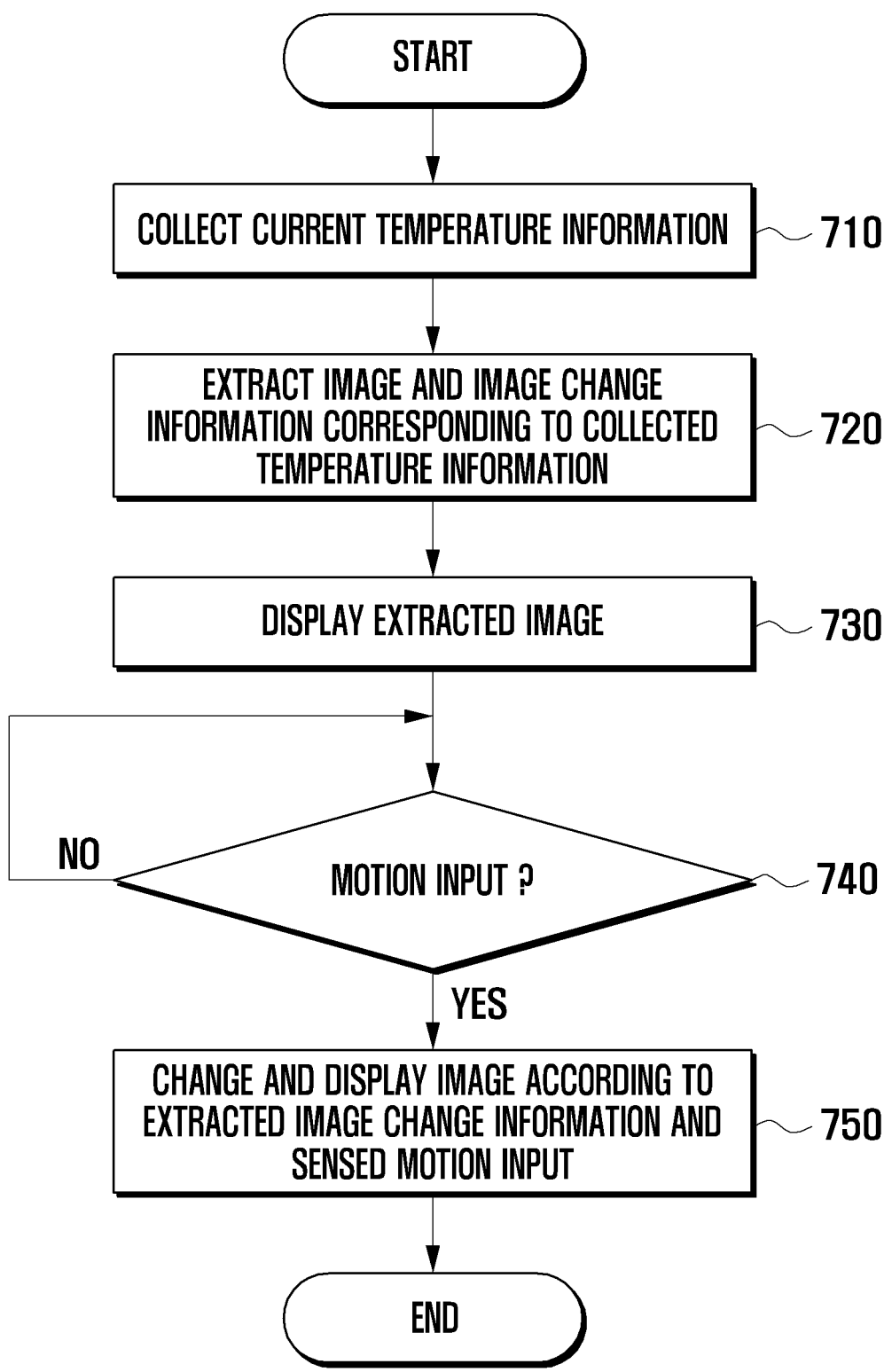
FIG. 7 is a flow chart illustrating a method for providing UI by a portable terminal according to a third exemplary embodiment of the present invention.

FIG. 7 is a flow chart illustrating a method for providing a UI by a portable terminal according to a third exemplary embodiment of the present invention. In the third exemplary embodiment of the present invention, a sensor unit 150 (shown in FIG. 1) preferably includes a first sensor unit and a second sensor unit. The first sensor unit is a sensor capable of collecting temperature information. The second sensor unit is a sensor sensing a motion input to the portable terminal.

At step (710), the control unit 180 controls the first sensor unit to collect current temperature information around a portable terminal. In an exemplary embodiment of the present invention, the control unit 180 may control a wireless communication unit 110 to collect temperature information from a server providing weather information through a wireless communication network.

At step (720), the control unit 180 extracts an image corresponding to the collected temperature information and image change information from a storage unit 140. In a third exemplary embodiment, the image is of a material whose state varies according to a temperature, and a material image is configured by an icon. In the same manner as in the first exemplary embodiment, an image of 'water' being a material whose state varies to 'ice', 'water', and 'steam' according to a temperature is applicable to the third exemplary embodiment. Further, respective images of other materials whose states vary according to a temperature are applicable to the third exemplary embodiment. An icon according to an exemplary embodiment of the present invention may be configured by a 2D or 3D image, according to a type of display screen used. A storage unit 140 stores material state information by temperatures. A control unit 180 checks material state information corresponding to collected temperature information from the storage unit 140. The material state information by temperatures shown in FIG. 3 is equally applicable to the third exemplary embodiment. The storage unit 140 stores a corresponding image and image change information by material states. The image corresponds to a material image (cube or square (ice), globe or circle (water), a set of small globes or circles (steam)). The image change information may correspond to moving speed of an icon or icon change information according to a motion input to the portable terminal.

At step (730), the control unit 180 controls a display unit 170 to display an extracted image (icon). The control unit 180 controls the display unit 170 to display icons according to a preset arrangement method. At step (740), the control unit 180 controls the second sensor unit to sense a motion input to the portable terminal. The motion according to the third embodiment of the present invention may include tapping, snapping, shaking, and tilting. The second sensor unit according to the third exemplary embodiment of the present invention is preferably configured by one or more of an acceleration sensor, gyro sensor, or terrestrial magnetic field sensor. In the third exemplary embodiment of the present invention, it is assume that a snapping or shaking motion is input to the portable terminal. Snapping refers to a motion input with more than set acceleration in a given direction. When a user input a motion in the portable terminal, at step (750) the control unit 180 senses a motion input and controls the display unit 170 to change and display an image according to the extracted image change information and the sensed motion input. Namely, when the second sensor unit senses a movement of the portable terminal and transfers it to the control unit 180, the control unit 180 changes and displays an icon according to image change information extracted based on moving information and current temperature information of the portable terminal received from the second sensor unit.

Figure 8A:
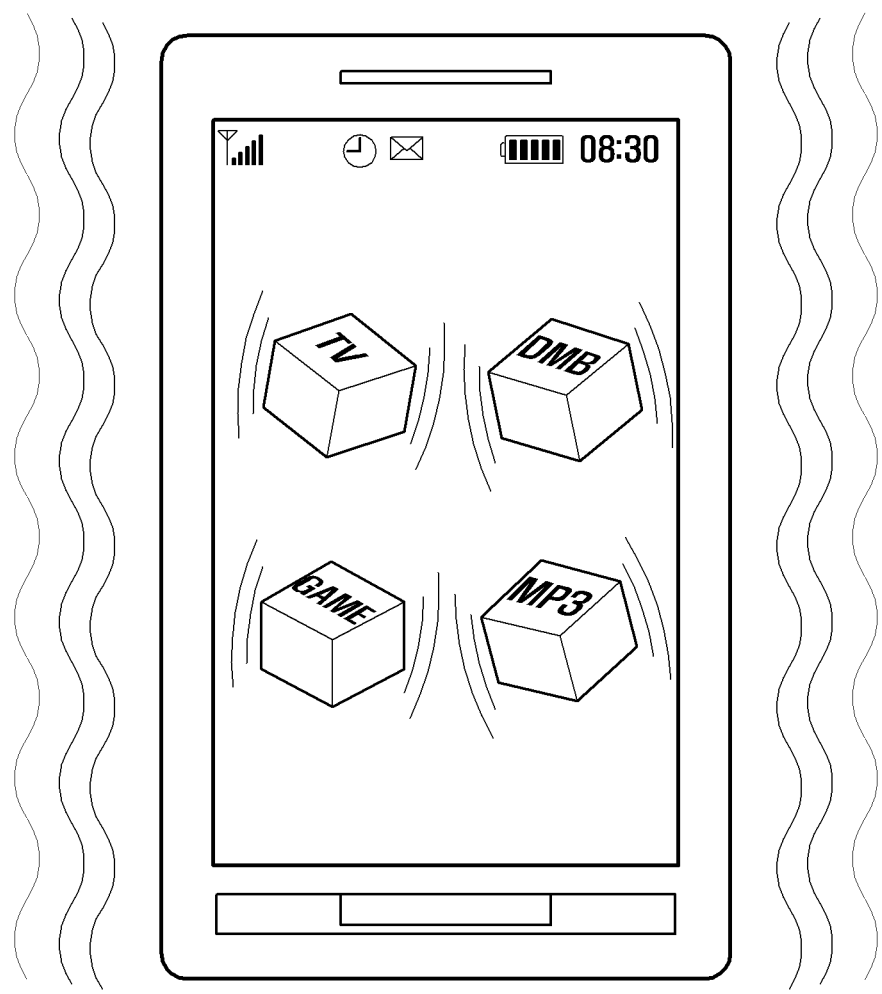
FIGS. 8A to 8C are views illustrating display screens displayed by providing a UI according to a first exemplary embodiment of the present invention, respectively.
Figure 8B:
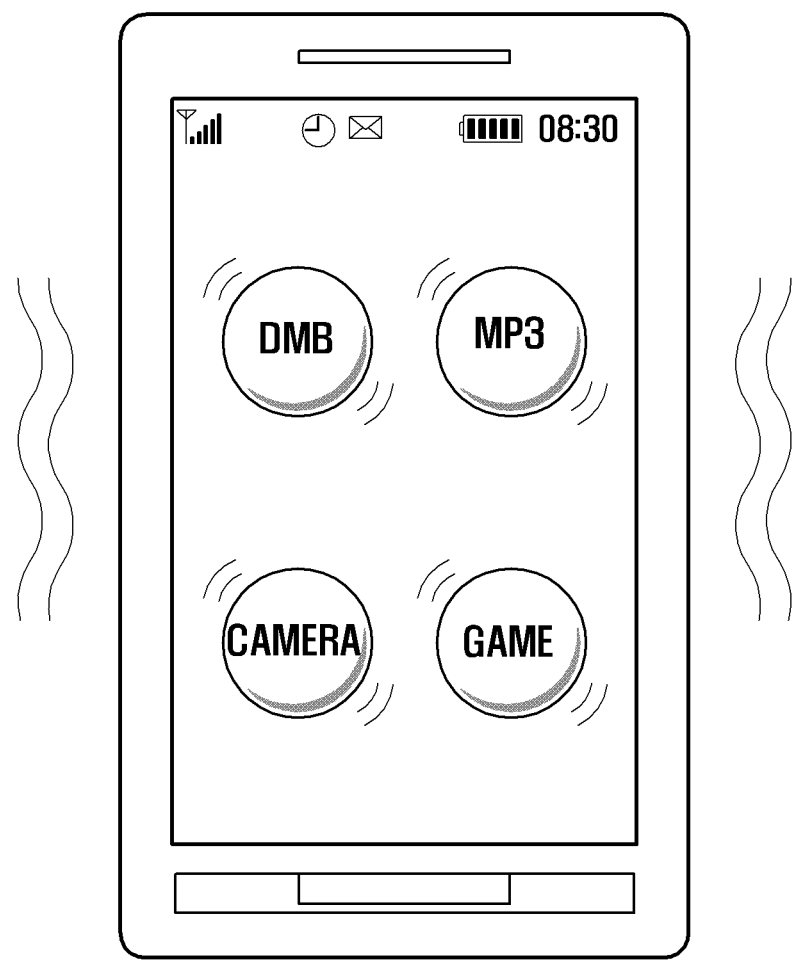
Figure 8C:
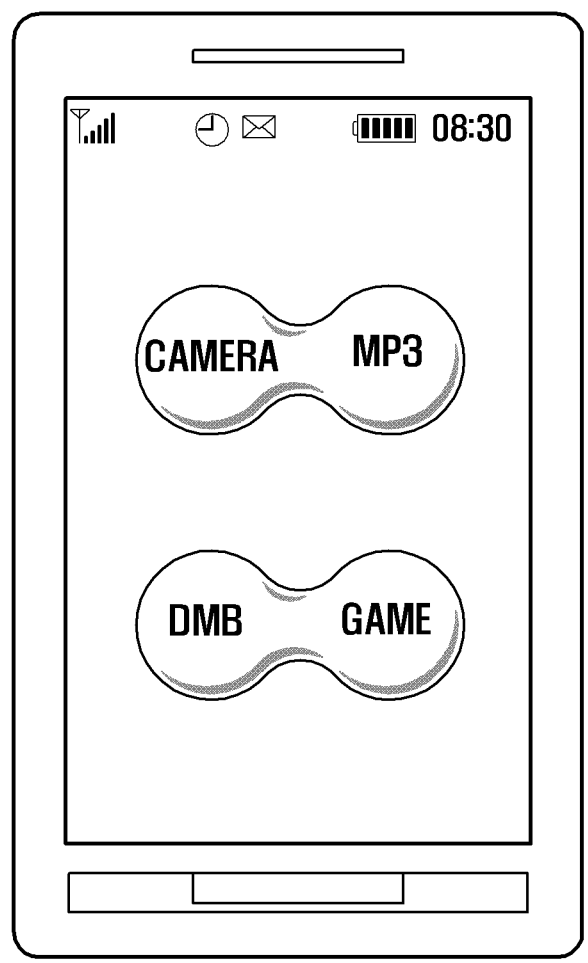

FIGS. 8A to 8C are views illustrating display screens displayed by providing a UI according to a first exemplary embodiment of the present invention, respectively. In accordance with FIG. 3, an artisan should appreciate that FIG. 8A shows an image of an 'ice' state, FIGS. 8B and 8C show an image of a 'water' state. FIG. 8A shows a pattern in which a cubical icon of 3D image is rotated. The control unit 180 changes and displays an icon based on intensity and a direction of a motion that a user input in the portable terminal, and icon information itself (image change information). In practice, when a cubical ice piece is put in a closed case and shaken, the ice piece moves in the case. In the present invention, real properties of a material are reflected in a method for providing UI in a portable terminal, and the control unit 180 rotates and displays an icon according to the intensity and direction of a motion input to the portable terminal.

FIG. 8B shows a pattern that a circular icon of a 3D image is rotated. When the same intensity of a motion is practically applied to a water drop and an ice piece, moving speed of the ice piece is higher than that of the water drop. The present invention reflects such real properties of a material. Referring to FIGS. 8A and 8B, assuming that the same intensity of a motion is input to the portable terminal, icons of FIG. 8A and icons of FIG. 8B are displayed that the icons of FIG. 8A is rotated faster than those of FIG. 8B.

FIG. 8C shows a changed pattern of an icon when a user slants the portable terminal displaying an icon shown in FIG. 8C in a leftward direction. Namely, FIG. 8C shows a pattern that two global icons located in a right side are moved to a left side to be combined with two global icons located in the left side. A pattern of the two combined icons is shown to be similar to that of two combined water drops. Image change information extracted at step 720 contains icon change information. The image change information refers to pattern change information of an icon according to a motion input. For example, icon change information corresponding to an 'ice' is information not to change an image shape according to the motion input. Icon change information corresponding to 'water' is information that combines and displays a plurality of icons into one icon according to the motion input.

In the same manner as in the first exemplary embodiment, the storage unit 140 may also store sound or vibration pattern information corresponding to current temperature information in the third exemplary embodiment of the present invention. In this case, the control unit 180 also extracts sound or vibration pattern information upon extracting an image and image change information corresponding to current temperature information at step 720. The extracted sound or vibration pattern information can be used to output sound or vibration according to a user's motion input. In a case where the sound or vibration pattern information corresponding to an 'ice' is set as a sound or vibration pattern occurring when an ice piece strikes against a wall, the sound or vibration pattern is also extracted when an icon and image change information corresponding to an 'ice' are extracted by the control unit 180.

When a user inputs a motion in the portable terminal in a state that an icon of an 'ice' shape shown in FIG. 8A is displayed, the control unit 180 controls an audio processing unit 120 or a vibration output unit 130 to output sound or vibration according to the extracted sound or vibration pattern information. Further, in a case where sound or vibration pattern information corresponding to 'water' is set as a sound or vibration pattern occurring when water drop strikes against a wall, the sound or vibration pattern is also extracted when the icon and image change information corresponding to 'water' are extracted by the control unit 180. When a user inputs a motion in the portable terminal in a state that an icon of a 'water' shape shown in FIG. 8b is displayed, the control unit 180 controls an audio processing unit 120 or a vibration output unit 130 to output sound or vibration according to the extracted sound or vibration pattern information. In practice, vibration intensity when an icon piece strikes against a wall is greater than that when a water drop strikes against the wall. Such real properties of a material are reflected in the portable terminal such that vibration occurring in an icon in a 'water' state is stronger than that in an icon in a 'water' state.

A third exemplary embodiment of the present invention provides a corresponding UI (image, sound, vibration output) to a user using a first sensor unit collecting temperature and a second sensor unit sensing a motion input to the portable terminal such that the user can feel improved emotional pleasure in using the portable terminal.

Figure 9:
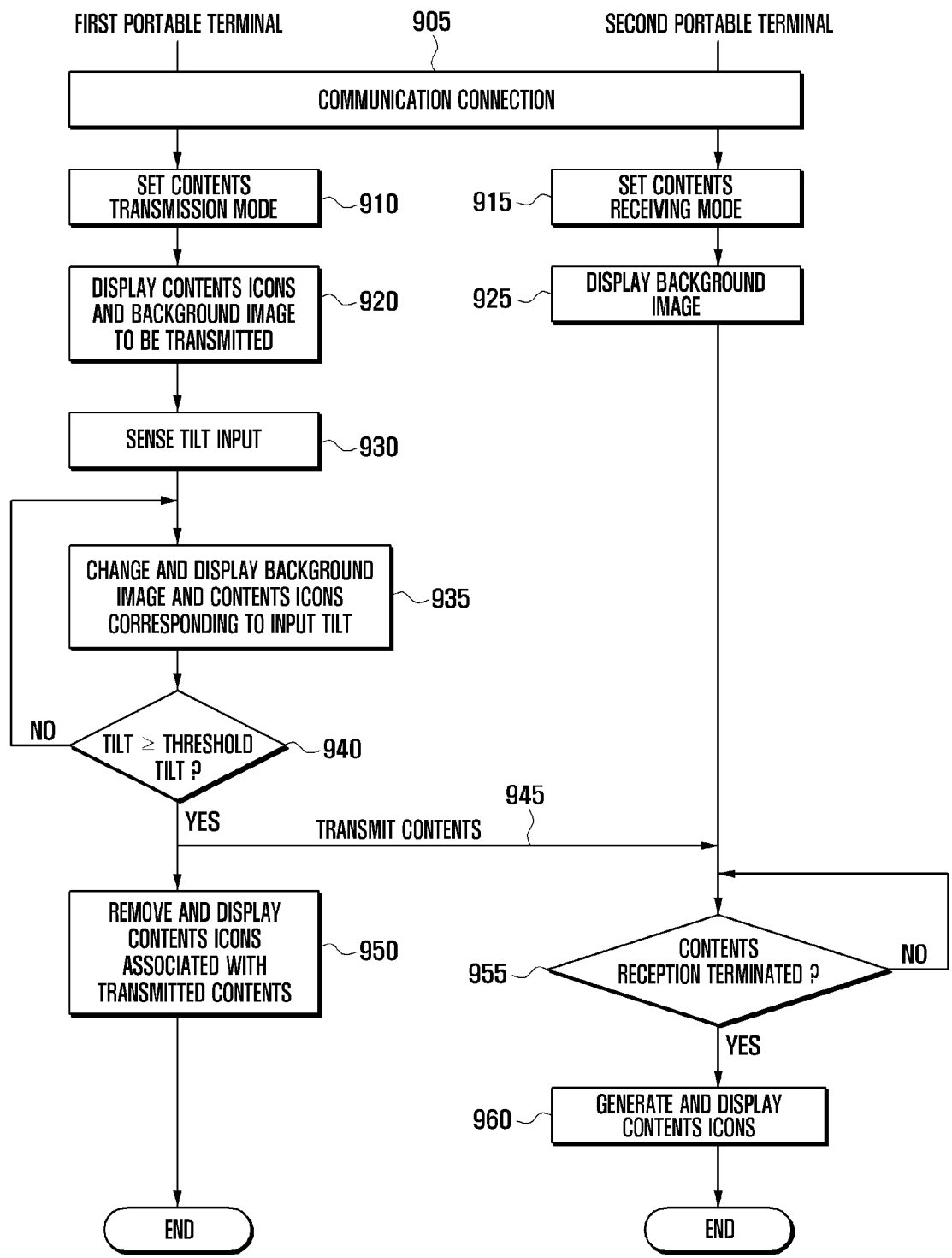
FIG. 9 is a flow chart illustrating a method for providing UI by a portable terminal according to a fourth exemplary embodiment of the present invention.

FIG. 9 is a flow chart illustrating a method for providing a UI by a portable terminal according to a fourth exemplary embodiment of the present invention. A fourth exemplary embodiment of the present invention illustrates a procedure for providing UI to a terminal user in transmitting and receiving contents by a first portable terminal and a second portable terminal. In the fourth exemplary embodiment of the present invention, each of the first portable terminal and the second portable terminal includes a near distance wireless communication unit. Each sensor unit 150 of the first portable terminal and the second portable terminal preferably includes a first sensor unit and a second sensor unit. The first sensor unit preferably comprises a sensor collecting temperature information, and the second sensor unit is a sensor sensing a motion input to the portable terminal. It is assumed that each control unit 180 of the first portable terminal and the second portable terminal controls the first sensor unit to collect temperature information, and extracts a background image and image change information corresponding to the collected temperature information from a storage unit 140.

Now referring to FIG. 9, at step (905), the first portable terminal and the second portable terminal control respective near distance wireless communication units to perform communication connection with each other. Bluetooth, Wifi, or Zigbee communication is preferably used as a communication connection technology between the first portable terminal and the second portable terminal. For example, when the Bluetooth communication technology is used, a Bluetooth module is included in each of the first portable terminal and the second portable terminal. The first portable terminal and the second portable terminal perform pairing with each other to connect for communication.

Next, at step (910), the control unit 180 of the first portable terminal sets a current portable terminal mode to a contents transmission mode. In more detail, when a user of the first portable terminal selects a contents transmission function included in the first portable terminal and selects at least one contents to be transmitted, the control unit 180 sets the portable terminal mode to the contents transmission mode. Consequently, at step (915) a control unit 180 of the second portable terminal sets a current portable terminal mode to a contents receiving mode.

Figure 10:
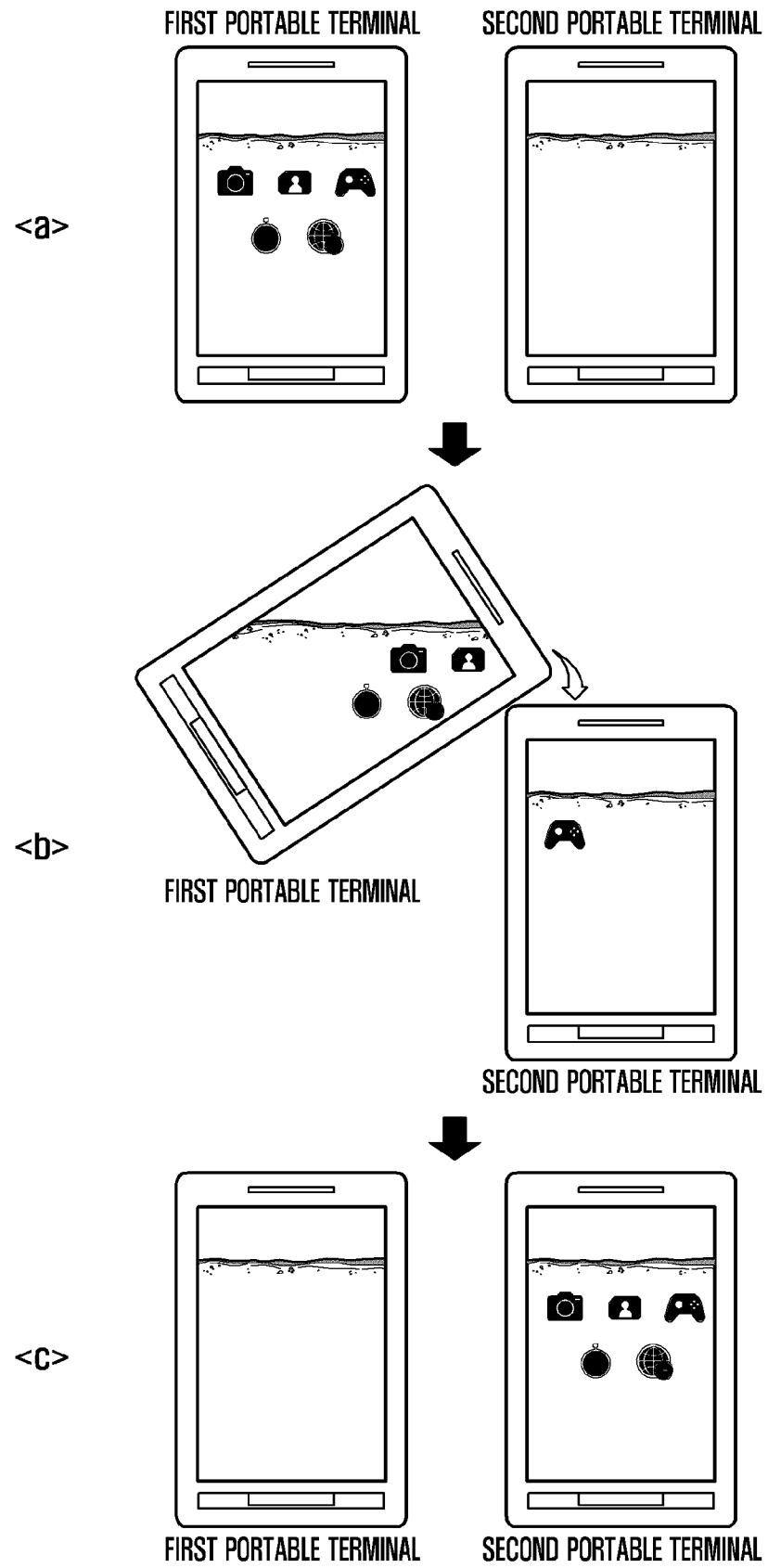
FIG. 10 is a view illustrating a display screen displayed by providing a UI according to a fourth exemplary embodiment of the present invention.

At step (920), the control unit 180 of the first portable terminal controls the display unit 170 to display contents icons and a background image to be transmitted. The background image is an image extracted according to current temperature information. At step (925), the control unit 180 of the second portable terminal controls the display unit 170 to display a background image. The background image displayed on the second portable terminal is also included in an extracted image according to current temperature information. FIG. 10 is a view illustrating a display screen displayed by providing a UI according to a fourth exemplary embodiment of the present invention. In example <a> of FIG. 10, a background image being a material image in a liquid state and contents icons associated with contents to be transmitted are illustrated in a first portable terminal. A background image being a material image in a liquid state is illustrated in the second portable terminal.

At step (930), the control unit 180 of the first portable terminal controls a second sensor unit to sense a tilt input.

When the second sensor unit senses the tilt of the first portable terminal, at step (935) the control unit 180 controls the display unit 170 to change and display a background image and contents icons corresponding to the input tilt. For example, the control unit 180 controls the display unit 170 to change and display a water surface of a material image in a liquid state according to a tilted direction and angle, and to move and display contents icons according the tilted direction and angle. In an exemplary embodiment of the present invention, the control unit 180 may change and display the background image and the contents icons according to the input tilt and the extracted image change information. Namely, the background image and the contents icons may be differently displayed according to current temperature information in the same tilted state.

At step (940), the control unit 180 of the first portable terminal controls the second sensor unit to sense tilt of the first portable terminal. When it is determined that the tilt of the first portable terminal is equal to or greater than a threshold tilt at step 940, the control unit 180 controls a near distance wireless communication unit to transmit contents to the second portable terminal. At step (950), the control unit 180 of the first portable terminal controls the display unit 170 to remove and display a contents icon associated with transmitted contents. It appears as though the contents are "poured" from the first terminal display to the second terminal display.

At step (955), the control unit 180 of the second portable terminal receives contents and checks whether contents reception is terminated. When the contents reception is terminated, then at step (960) the control unit 180 of the second portable terminal controls the display unit 170 to generate and display a contents icon associated with the received contents.

Example <b> of FIG. 10 illustrates display screens of the first portable terminal and the second portable terminal when one contents are transmitted to the second portable terminal. The first portable terminal displays four contents icons from which one contents icon is removed. One contents icon is generated and displayed on the second portable terminal. In an exemplary embodiment of the present invention, the control unit 180 of the first portable terminal may control a display unit 170 to remove and display a contents icon associated with contents transmitted after transmitting termination of contents. Further, the control unit 180 of the second portable terminal may control a display unit 170 to generate and display contents icons associated with contents being received before receiving termination of contents.

The transmission of contents is performed until at least one contents selected by a user for transmission is completely transmitted to the second portable terminal. Each time the contents are transmitted, contents icons are removed and displayed, but the contents icons are generated and displayed. Example <c> of FIG. 10 illustrates a pattern that at least one contents selected by a user is all transmitted from the first portable terminal to the second portable terminal. All contents icons are removed from display on the first portable terminal, but all five contents icons are generated and displayed on the second portable terminal.

In the same manner as in the first exemplary embodiment, each storage unit 140 stores sound or vibration pattern information corresponding to current temperature information in a fourth exemplary embodiment of the present invention. Each control unit 180 of the first portable terminal and the second portable terminal may also extract sound or vibration pattern information in extracting an image corresponding to current temperature information and image change information. The extracted sound or vibration pattern information can be used to output the sound or vibration according to a tilt input.

In an exemplary embodiment of the present invention, the control unit 180 of the first portable terminal may control a near distance wireless communication unit to check whether the second portable terminal approximates to the first portable terminal after performing step 920. Only when the first portable terminal approximates to the second portable terminal, the control unit 180 may set data to be transmitted. The first portable terminal checks for the presence of execution of data transmission according to a tilt input according to whether the second portable terminal is within approximate reception distance to the first portable terminal to perform communication therewith. Near Field Communication (NFC), Radio Frequency Identification (RFID) or Infrared communication technology is preferably used to check whether portable terminals sufficiently approximate to each other to perform communication. The foregoing communication technology may not only recognize presence of approximation of a given object but also check information what device(s) are approximates thereto to perform communication therewith. Namely, the first portable terminal may check that the second portable terminal is approximate thereto to perform communication. When the control unit 180 of the first portable terminal recognizes an approximation of the location of the second portable terminal through a near distance wireless communication unit, a control unit 180 of the second portable terminal also recognizes that the first portable terminal approximates thereto through the near distance wireless communication unit.

A fourth exemplary embodiment of the present invention provides a corresponding UI (image, sound, vibration output) to a user using a first sensor unit collecting temperature and a second sensor unit sensing tilted state information the portable terminal such that the user can feel improved emotional pleasure and can intuitively judge a current data transmission state.

In an exemplary embodiment of the present invention, a portable terminal may include a menu selecting a UI mode. For example, a temperature sensor and a humidity sensor are all included in the portable terminal associated with the first sensor unit, a menu selecting whether to drive only a temperature sensor, only a humidity sensor, or both of them by a user can be included. Further, both of an acceleration sensor and a terrestrial magnetic field sensor are preferably included in the portable terminal associated with the first sensor unit, a menu selecting whether to drive only the acceleration sensor, only the terrestrial magnetic field sensor, or both of them by the user can be included. Further, a menu selecting whether to collect temperature information or humidity information using a first sensor or to collect weather information through a wireless communication unit 110 may be included. Moreover, a menu selecting what UI is provided among the first to fourth exemplary embodiments.

In an exemplary embodiment of the present invention, the temperature information and the humidity information collected by the first sensor unit are applicable to an application screen of a portable terminal showing a real background. For example, in a case of a portable terminal executing a navigation function, a map of a 3D image can be displayed similar to a real background (roads, buildings).

The control unit 180 controls the first sensor unit to collect temperature information or humidity information. When the temperature is high, the control unit 180 displays heat haze on a road using the collected temperature information. When humidity is high, the control unit 180 may display water drop in air using the collected humidity information. Further, the portable terminal may control the wireless communication unit 110 to receive weather information and apply it to an application screen showing a real background. For example, the control unit 180 receives weather information using the wireless communication unit 110. When the control unit 180 receives weather information that it is raining now, it may show a rainy image on a 3D image map.

The above-described methods according to the present invention can be realized in hardware or as software or computer code that can be stored in a recording medium such as, for example, a CD ROM, a DVD, a RAM, thumbnail drive, a floppy disk, a flash storage, a hard disk, or a magneto-optical disk or downloaded over a network, so that the methods described herein can be executed by such software using a general purpose computer, or a special processor, microprocessor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for controlling a user interface (UI) in a portable terminal, the method comprising:
    displaying at least one icon associated with data to be transmitted and a background image depicting a material, the background image being displayed in accordance with: a tilted state of the portable terminal, one or more ambient conditions of the portable terminal, and material state information indicating a physical characteristic of the material that occurs when the one or more ambient conditions are present; and
    re-displaying, by the portable terminal, the background image and the at least one icon when the tilted state of the portable terminal is equal to or greater than a threshold tilt, the re-displaying including changing a tilt of the at least one icon in accordance with the material state information;
    wherein the re-displaying is performed when the data is transmitted to another portable terminal.

2. The method of claim 1, further comprising:
    determining whether the other portable terminal is within a predetermined distance from the portable terminal; and
    setting, when the other portable terminal is within the predetermined distance, the data to be transmitted.

3. The method of claim 1, wherein the at least one icon comprises a content icon associated with the data to be transmitted, and re-displaying the at least one icon includes removing the content icon from a display unit of the portable terminal after the data is transmitted to the other portable terminal.

4. The method of claim 1, wherein re-displaying the at least one icon includes displaying a visual movement of the at least one icon from the portable terminal to the other portable terminal, and wherein the visual movement includes moving the at least one icon based on the tilted state of the portable terminal.

5. The method of claim 4, further comprising displaying the visual movement of the at least one icon based on a type of the material.

6. The method of claim 1, wherein re-displaying the background image comprises displaying a second tilt of a cross-section of a surface of the material according to the tilted state of the portable terminal.

7. The method of claim 1, further comprising:
    collecting environmental information around the portable terminal; and
    extracting a sound or vibration pattern corresponding to the collected environmental information.

8. The method of claim 7, further comprising:
    sensing a touch input to the portable terminal; and
    outputting sound or vibration according to the extracted sound or vibration pattern when the touch input is sensed.

9. The method of claim 1, wherein re-displaying the at least one icon includes displaying a visual movement of the at least one icon from the portable terminal to the other portable terminal, and wherein the visual movement includes moving the at least one icon based on the material state information.

10. The method of claim 1, wherein the material includes at least one of water, wine, beer, juice, milk, or coffee.

11. The method of claim 1, wherein the material state information identifies at least two different states of matter of the material that occur at different ambient conditions.

12. The method of claim 11, wherein the material state information identifies an ambient condition at which a liquid state of the material occurs and an ambient condition at which a solid state of the material occurs.

13. The method of claim 11, wherein the material state information identifies an ambient condition at which a gaseous state of the material occurs.

14. A method for controlling a user interface (UI) in a portable terminal, comprising:
    displaying a background image and at least one icon associated with data to be transmitted, the background image depicting a cross-section of a surface of a material;
    sensing, by the portable terminal, an input for triggering a transmission of the data to another portable terminal; and
    re-displaying the background image and the at least one icon according to the sensed input and a tilted state of the portable terminal, the re-displaying including:
        (i) displaying the cross-section of the surface of the material at a first tilt of the cross-section, the first tilt of the cross-section being based on physical characteristics of the material that occur at a current ambient condition of the portable terminal, and
        (ii) displaying the at least one icon at a second tilt of the at least one icon, the second tilt of the at least one icon being based on the physical characteristics of the material that occur at the current ambient condition.

15. The method of claim 14, wherein the current ambient condition includes at least one of temperature information, humidity information, and weather information.

16. The method of claim 15, wherein:
    the current ambient condition includes information corresponding to a condition of condensation or frost formation, and
    displaying the background image further includes displaying a depiction of the condensation or frost formation.

17. The method of claim 16, wherein the background image includes information specifying an intensity of a touch on a touchscreen, and
    re-displaying the background image includes removing the depiction of the condensation or frost formation in an area of the touchscreen in which touch input having the specified intensity is sensed while continuing to maintain the depiction of the condensation or frost formation in another area of the touchscreen.

18. The method of claim 14, wherein re-displaying the at least one icon includes moving the at least one icon in response to the sensed input.

19. The method of claim 14, wherein:
    sensing the input comprises sensing a motion input to the portable terminal, and
    re-displaying the at least one icon includes moving the at least one icon according to the sensed motion input.

20. The method of claim 14, further comprising:
    extracting a sound or vibration pattern corresponding to the current ambient condition, and
    outputting a sound or a vibration according to the extracted sound or vibration pattern.

21. The method of claim 14, wherein the at least one icon comprises a contents icon associated with the data to be transmitted, and
    re-displaying the background image and the at least one icon further includes removing the contents icon from a screen of the portable terminal after the data is transmitted to the other portable terminal.

22. The method of claim 14, wherein re-displaying the at least one icon includes displaying a visual movement of the at least one icon from the portable terminal to the other portable terminal, and removing the at least one icon from display after the data are transmitted.

23. The method of claim 14, wherein the portable terminal comprises a display screen having a first side and a second side and the cross-section of the surface of the material extends from the first side to the second side, across the entire display screen.

24. The method of claim 14, wherein the physical characteristics of the material include at least two different states of matter of the material.

25. The method of claim 24, wherein the at least two different states of matter of the material include a liquid state of matter and a solid state of matter.

26. The method of claim 24, wherein the at least two different states of matter include a gaseous state of matter.

27. The method of claim 14, wherein:
    the cross-section of the surface of the material is displayed between a first edge and a second edge of the portable terminal; and
    the displaying the cross-section of the surface of the material at the first tilt and the displaying of the at least one icon at the second tilt includes aligning the at least one icon with the cross-section of the surface of the material and rotating the at least one icon relative to the first edge and the second edge of the portable terminal.

28. A portable terminal for providing a user interface (UI), comprising:
    a sensor unit comprising:
    a first sensor unit for collecting environmental information around the portable terminal;
    a second sensor unit for sensing a tilted state of the portable terminal or an input to the portable terminal;
    a storage unit for storing image change information;
    a display unit for displaying at least one icon associated with data to be transmitted and a background image, the background image depicting a cross-section of a surface of a material; and
    a control unit for receiving the environmental information from the first sensor unit, extracting image change information that corresponds to the received environmental information, receiving from the second sensor unit an indication of the tilted state or input, controlling the display unit to re-display the background image based on the extracted image change information when the tilted state of the portable terminal is equal to or greater than a threshold tilt, and further controlling the display unit to show a process of data transmission to another portable terminal when the tilted state of the portable terminal is equal to or greater than the threshold tilt,
    wherein re-displaying the background image comprises displaying the cross-section of the surface of the material at a tilt, the tilt of the cross-section being based on a physical characteristic of the material that occurs when a current ambient condition is present, the current ambient condition being indicated by the environmental information that is received from the first sensor unit.

29. The portable terminal of claim 28, wherein the environmental information includes at least one of temperature information, humidity information, and weather information. icon based on the material state information.

30. The portable terminal of claim 28, wherein showing the process of data transmission includes displaying a visual movement of the at least one icon from the portable terminal to the other portable terminal, and wherein the visual movement includes moving the at least one icon based on the tilted state of the portable terminal.

31. The portable terminal of claim 28, wherein the display unit includes a first side and a second side and the cross-section of the surface of the material extends from the first side to the second side, across the entire display unit.

32. The portable terminal of claim 31, wherein the tilt of the cross-section is based on whether the material is in one of at least a liquid state and a solid state when the current ambient condition is present.

\* \* \* \* \*

UNITED STATES PATENT AND TRADEMARK OFFICE
CERTIFICATE OF CORRECTION

| | |
|---|---|
| PATENT NO. | : 8,836,718 B2 |
| APPLICATION NO. | : 12/858537 |
| DATED | : September 16, 2014 |
| INVENTOR(S) | : Hyong Uk Choi et al. |

It is certified that error appears in the above-identified patent and that said Letters Patent is hereby corrected as shown below:

In the Claims

Column 18, Claim 29, Line 56 should read as follows:
--...information, humidity information, and weather information...--

Signed and Sealed this
Twenty-fifth Day of November, 2014

Michelle K. Lee
*Deputy Director of the United States Patent and Trademark Office*